United States Patent
Jalenques

(10) Patent No.: US 9,403,608 B2
(45) Date of Patent: Aug. 2, 2016

(54) GRAVIMETRIC DISPENSING SYSTEM

(71) Applicant: Interscience, St Nom la Breteche (FR)

(72) Inventor: Emmanuel Jalenques, St Nom la Breteche (FR)

(73) Assignee: INTERSCIENCE, St Nom la Breteche (FR)

( * ) Notice: Subject to any disclaimer, the term of this patent is extended or adjusted under 35 U.S.C. 154(b) by 0 days.

(21) Appl. No.: 14/625,254

(22) Filed: Feb. 18, 2015

(65) Prior Publication Data

US 2015/0232209 A1 Aug. 20, 2015

(30) Foreign Application Priority Data

Feb. 18, 2014 (FR) ...................................... 14 51281

(51) Int. Cl.
*B65B 3/28* (2006.01)
*B65B 3/06* (2006.01)
*B67D 7/32* (2010.01)

(52) U.S. Cl.
CPC ... *B65B 3/28* (2013.01); *B65B 3/06* (2013.01); *B67D 7/3209* (2013.01)

(58) Field of Classification Search
CPC ........ B67D 7/3209; G01G 21/22; B65B 3/28; B65B 3/06
USPC ........................ 141/83, 86–88; 137/312–314; 222/108–109, 77; 220/571; 177/126, 177/180, 262, 245; 73/296
See application file for complete search history.

(56) References Cited

U.S. PATENT DOCUMENTS

| | | | |
|---|---|---|---|
| 1,606,970 A * | 11/1926 | Thomas | G01G 1/00 177/176 |
| 4,350,186 A | 9/1982 | Schalkowsky et al. | |
| 4,401,176 A * | 8/1983 | Knothe | G01G 21/23 177/180 |
| 5,736,105 A | 4/1998 | Astle | |
| 5,935,859 A | 8/1999 | Elliott et al. | |
| 6,557,391 B2 * | 5/2003 | Luchinger | G01G 21/22 177/50 |
| 7,051,581 B2 | 5/2006 | Mansky et al. | |
| 7,737,372 B2 * | 6/2010 | Dougherty, Jr. | E02D 31/00 177/245 |
| 8,278,034 B2 | 10/2012 | Muraca | |
| 2004/0202573 A1 | 10/2004 | van den Brink et al. | |
| 2006/0002824 A1 | 1/2006 | Chang et al. | |
| 2007/0095421 A1 | 5/2007 | Page | |
| 2009/0220385 A1 | 9/2009 | Brown et al. | |

* cited by examiner

*Primary Examiner* — Mark A Laurenzi
*Assistant Examiner* — Timothy P Kelly
(74) *Attorney, Agent, or Firm* — Thomas P. O'Connell; O'Connell Law Firm

(57) ABSTRACT

A gravimetric dispensing system for dispensing a predetermined quantity of liquid into a container. The system has a base structure with a weighing apparatus and a support stand for retaining a container disposed to receive a quantity of liquid. The weighing apparatus supports the support stand to provide a determination of a weight of the support stand, the container, and any liquid deposited into the container, and a receptacle collects any leaked liquid, including liquid from the container or where the container is missing. The receptacle can be removable and can include at least one tank. The receptacle can have a bottom, an opening in the bottom to permit spacing from the weighing apparatus, and ledges surrounding the bottom and the opening. The receptacle can be fixed or removable, such as upon removal of the support stand. A locating formation can engage a corresponding formation on the base structure.

14 Claims, 2 Drawing Sheets

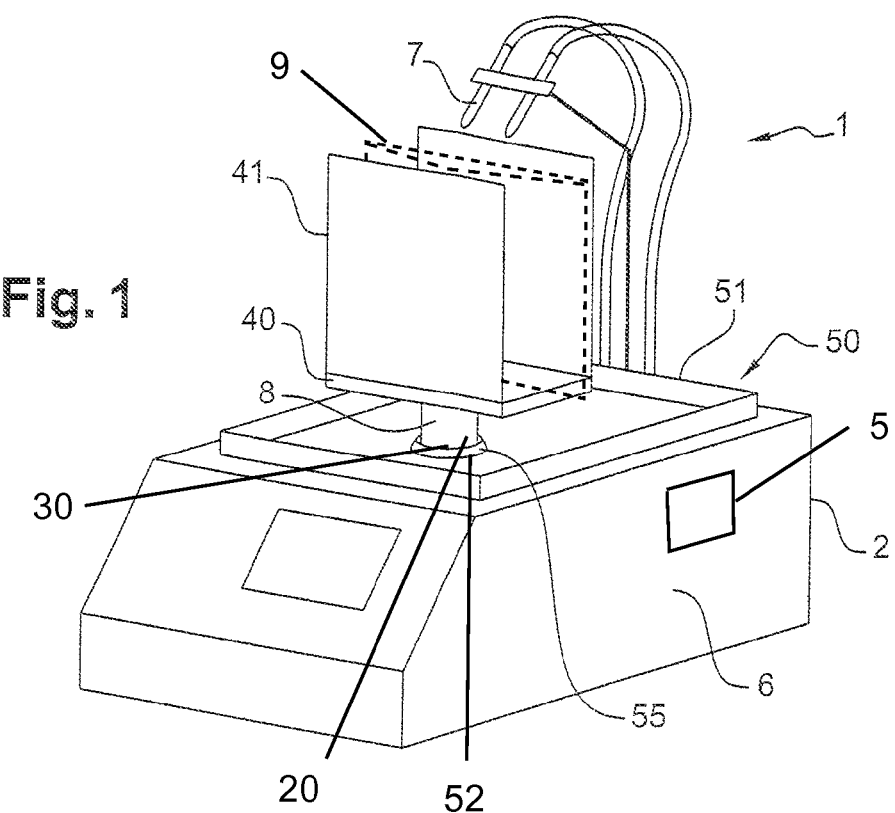
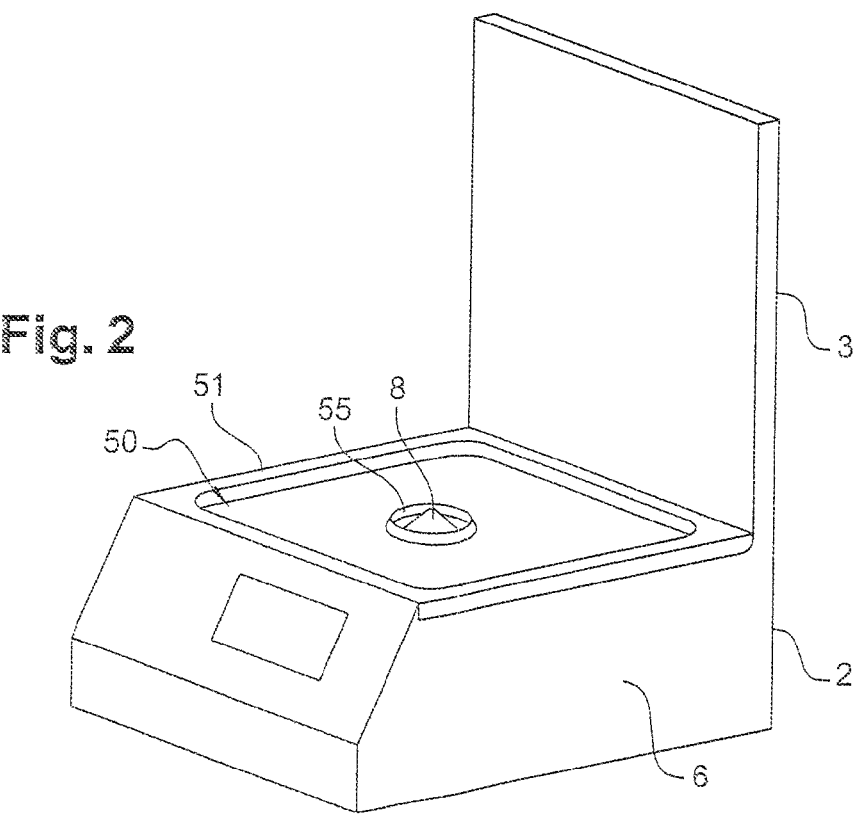

GRAVIMETRIC DISPENSING SYSTEM

RELATED APPLICATION

This application claims priority to French Application No. 14 51281, filed Feb. 18, 2014.

FIELD OF THE INVENTION

The present invention is in the field of the dispensing of liquids and viscous fluids, particularly the dilution of liquids and viscous fluids, which may hereinafter be referred to as the liquid. It will be understood that the term liquid shall include liquids and viscous fluids except where expressly limited by the claims. The disclosed system may be implemented in analytical laboratories of the food, medical, cosmetic, chemical and pharmaceutical industries. Accordingly, the present invention relates to a gravimetric dispensing system for a given quantity of liquid, and more specifically to a gravimetric dilutor.

BACKGROUND OF THE INVENTION

Gravimetric dispensing means the dispensing of a predetermined weight of liquid into a container. The liquid is brought by one or more delivery mechanisms to a point located above the container at a non-zero distance from either the bottom of the container or a filling opening of the container. The liquid then flows into the container. A weighing mechanism controls the stop of the dispensing when the predetermined weight is reached.

Among the known gravimetric dispensers, it is frequent that some liquid leaks out of the container. More specifically, liquid of then leaks onto the support where the container is located and, additionally or alternatively, onto the base hosting the weighing mechanism. This raises problems including hygiene failure and longer cleaning requirements, such as where the liquid has spread. The cleanup may be more or less laborious depending on where the liquid leaked.

The present inventor has thus appreciated that there is a need in the art for a gravimetric dispensing system that reduces the drawbacks related to accidental liquid leakage outside the container.

SUMMARY OF THE INVENTION

In view of the present state of the art, the invention disclosed herein is founded on the basic object of providing a gravimetric dispensing system that reduces the drawbacks related to accidental liquid leakage outside the container.

A more specific purpose of this invention is to propose a gravimetric dispensing system that is easy to clean thereby reducing, among other things, required cleanup tasks and the labor involved therein.

According to the invention, an embodiment of the gravimetric dispensing system of a predetermined quantity of liquid can have a base hosting weighing apparatus and a support stand for supporting a container. The support stand is connected to the weighing apparatus. The system provides a receptacle to collect any liquid that leaks out of the container or to collect any liquid should there be no container. According to the invention, the gravimetric dispensing system is easy to clean. When any liquid leaks out of the container, it is collected in the receptacle. With this, leakage and contamination of the base and the surface where the dispensing system stands can be avoided.

Preferably, the receptacle has the general shape of a tray and covers partly or completely the base of the gravimetric dispensing system. This way, the receptacle has a significant capacity without being bulky in height, and it collects the liquid on a large surface below the container, properly protecting the base. The receptacle may be of different sizes. In certain embodiments, it can cover substantially the entire upper face of the gravimetric dispensing system.

In another advantageous embodiment, the receptacle presents at least one tank. It may then contain a large quantity of liquid in case of a leaking container.

In certain embodiments, the container can have at least one dispensing spout, which eases the discharge of the collected liquid.

The receptacle may have one or more ledges, preferably a continuous ledge, preferably round, along the periphery of the receptacle.

In another embodiment, the receptacle can be integrated onto the upper face of the base. For example, the upper face of the base can be shaped as a bowl of roughly the same shape as the outer face of the container. In another embodiment, the upper face of the base, shaped as a bowl, can be the container.

In particular and according to the invention, the receptacle can be inserted above the base and below the support stand.

In a preferred embodiment, the receptacle can lay on the base and can be separated from the weighing apparatus in such a manner that liquid collected by the receptacle does not influence the weighing. Such embodiments of the system have the advantage of not weighing any liquid that leaks out of the container. The quantity of liquid introduced in the container can then still be precisely weighed.

In a preferred embodiment, the receptacle presents at least one opening for the connection between the weighing apparatus and the support stand. In that case, the receptacle can completely surround the connection between the support stand and the weighing apparatus. With an opening wide enough, friction can be avoided between the support stand and/or the sensitive body of the weighing apparatus on one hand and the receptacle on the other hand. This way, neither the weighing of the container content nor the calibration will be distorted.

In certain embodiments, the opening can be surrounded by a ledge, and the ledge can point upward.

In a preferred embodiment, the receptacle can be removable. This way, the receptacle is rendered even easier to clean before being returned to position for the next operation of gravimetric distribution.

Advantageously, the support stand could be separable from the weighing means, and the receptacle is removable when the support stand is separated from the weighing apparatus. It is then very convenient to remove the receptacle.

In another embodiment, the removable receptacle can have a notch, and the notch can receive the connection between a support stand and the sensitive body of the weighing apparatus and enables a lateral removal of the receptacle.

In such embodiments, the protection against streaks may not be fully complete around the connection, but it is advantageously possible to remove the receptacle without prior disassembly of the support stand, which may then be permanently connected to the sensitive body of the weighing apparatus.

The removable receptacle can include at least one locating pin to ease its positioning on the base of the gravimetric dispensing system.

In another embodiment, the receptacle can be fixed to the support stand. The receptacle and the support stand could form one single piece.

These particularities confer several advantages on embodiments of the gravimetric dispensing system. For example, the gravimetric dispensing system is easier to clean. The user will not lose time cleaning liquid that would have otherwise spread on the surface of the base. In addition, the receptacle, when it is removable, is adaptable to different models of gravimetric dispensing systems. Therefore, a user may simply use another removable receptacle to continue the preparation of a sample while one receptacle is removed for cleaning. These characteristics make the removable receptacle convenient to use. These and other advantages will be appreciated by one skilled in the art reviewing the present disclosure and to one who has the opportunity to observe an embodiment of the invention in use.

One will appreciate that the foregoing discussion broadly outlines certain more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention. It will thus be clear that additional features and benefits of the invention will be apparent through a reading of the detailed description of implementations and embodiments, which are without restriction, and by reference to the attached figures.

BRIEF DESCRIPTION OF DRAWINGS

Other particularities and advantages of the invention will appear during the reading of the detailed description of implementations and embodiments without restrictions, and of attached figures:

FIG. 1 is a schematic perspective view of a gravimetric dispensing system embodying the present invention;

FIG. 2 is a schematic perspective view of an alternative gravimetric dispensing system according to the invention without the support stand and the delivery apparatus;

DETAILED DESCRIPTION OF PREFERRED EMBODIMENTS

Figure 3:
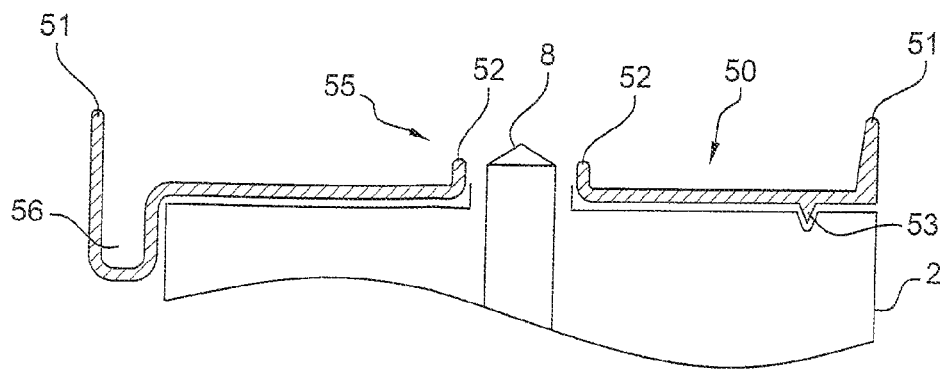
FIG. 3 is a partial sectional view in side elevation taken along the axis of the weighing shaft, the base, and the removable receptacle according to another embodiment of the invention.

The gravimetric dispensing system disclosed herein is subject to a wide variety of embodiments. However, to ensure that one skilled in the art will be able to understand and, in appropriate cases, practice the present invention, certain preferred embodiments of the broader invention revealed herein are described below and shown in the accompanying drawing figures. Therefore, before any particular embodiment of the invention is explained in detail, it must be made clear that the following details of construction and illustrations of inventive concepts are mere examples of the many possible manifestations of the invention. Further, the invention is not limited to the disclosed preferred embodiments, and one may skilled in the art will be aware based on the present disclosure of variants of the invention that would include only a selection of the features described subsequently, perhaps isolated from the others features described, and such a selection of features may nonetheless offer a technical benefit or differentiate the invention in comparison with the state of the art.

With this in mind and looking more particularly to the accompanying figures, an embodiment of the gravimetric dispensing system 1 for dispensing a given quantity of liquid as shown in FIG. 1 has a delivery apparatus 7, which can be contactless. The delivery apparatus conveys liquid, such as a physiological serum, up to a container, such as a sterile bag as schematically indicated at 9 in FIG. 1, through one or more conveying conduits. Several liquids could be conveyed through several conduits. For example, in FIG. 1, two conduits are shown for conveying two liquids. The delivery apparatus 7 can have one or several pumps, such as one or more peristaltic pumps as indicated schematically at 5 in FIG. 1, for causing the liquid to be dispensed.

The gravimetric dispensing system 1 has a support stand 40 supporting the container 9. The support stand 40 is mechanically connected to the sensitive body of the weighing apparatus 6. The sensitive body of the weighing apparatus 6 can include a weighing shaft 8, which transmits the weight force to be measured. The support stand 40 can include a lower sleeve 30 atop the shaft 8 that transmits to the shaft 8 the weight of the support stand 40, of the container 9, and of contents of the container 9. As illustrated, the support stand 40 can have two upstanding walls 41 to maintain the container 9 on the support stand 40.

The support stand 40 rests on the shaft 8 in such a manner that the filling of the container 9 is detected by the weighing apparatus 6 under the form of a measure of the increase of the weight of the container 9. The weighing shaft 8 crosses the upper face of the base 2 to join the support stand 40 of the container.

In the embodiment of FIG. 1, the gravimetric dispensing system 1 has a receptacle 50, which has the shape of a tray, allowing the collection of liquid in case of accidental discharge out of the container 9 or otherwise. The receptacle 50 is wisely placed between the support stand 40, which is located above the receptacle 50, and the upper face of the base 2, which is located below the receptacle 50. Preferably, to intercept properly any liquid that did not correctly find its way into the container 9 or which escaped from it, the breadth of the footprint of the receptacle 50 seen from above preferably encompasses and extends beyond rather widely the entire periphery of the support stand 40.

In the embodiment of FIG. 1, the removable receptacle 50 has a central opening 55. The central opening 55 is passed through by the connection 20 between the support stand 40 and the weighing apparatus 6. The connection 20 could comprise, for example, the weighing shaft 8 and/or a sleeve 30 that could be firmly fixed to the support stand 40 and located atop the shaft 8 when the support stand 40 is in place. The opening 55 can be such that the receptacle 50 does not contact the connection 20, or derivatively the weighing shaft 8, so that the receptacle 50 does not impede the weighing of the solution nor the function of the weighing apparatus 6 to neutralize the combined weight of the support stand 40 and the container 9 in the measure of the weight.

The support stand 40 is separable from the weighing apparatus 6 and particularly from the weighing shaft 8. Thus, the removable receptacle 50 can be positioned quickly and conveniently as it only requires lowering the removable receptacle 50 into place vertically on the upper face of the base 2 after removal of the support stand 40.

In this example, the receptacle 50 takes the form of a tray with a generally flat bottom and a surrounding outer ledge 51. In addition, an inner ledge 52 surrounds completely the opening 55. The ledges 51 and 52 extend upward, preferably vertically, of a non-zero height from the bottom of the receptacle 50. The removable receptacle 50 can, as shown, have a rectangular shape.

The receptacle 50 may also cover partly or completely the upper face of the base 2. In the embodiment of FIG. 1, the removable receptacle 50 partly covers the upper face of the base 2 but extends beyond the stand 40 in all lateral directions whereby any leaking liquid will be readily caught and retained by the receptacle 50.

The receptacle 50 could be fixed to the base 2, or it could be removable from the base 2. The removability of the receptacle 50 can be facilitated by the removal of the support stand 40 as shown, for instance, in FIG. 2. It should be understood, however, that it is within the scope of the invention except as the claims might limit it for the receptacle 50 to be rendered removable in some other manner.

In the embodiment of FIG. 2, which will be described primarily for its differences with the embodiment of FIG. 1, the gravimetric dispensing system 1 also has an upper part 3 connected to the base 2. The upper part can enable, for example, the retention of a delivery apparatus 7, which could be similar to that shown in FIG. 1. In the present embodiment, the receptacle 50 is readily removable to facilitate the cleaning of the system 1.

In the embodiment of FIG. 2, the support stand 40, which can be similar to that shown in FIG. 1, is separable and has been removed from the weighing apparatus 6 and particularly from the weighing shaft 8. The removability eases the cleaning of, among other things, the support stand 40. In the absence of the support stand 40, it is possible to position and remove the removable receptacle 50. When positioned, the receptacle 50 simply lays by gravity on the base 2.

Furthermore, the removable receptacle 50 completely covers substantially the entire upper face of the base 2, optimally protecting the upper face of the base 2. The base 2 may have a portion shaped as a bowl or otherwise corresponding to and closely fitting in the inner face of the receptacle 50. With that, the receptacle 50 can be positioned in a stable manner.

Looking to FIG. 3, an alternative receptacle 50 is illustrated. There, the removable receptacle 50 includes a receiving tank 56, which in this embodiment is disposed adjacent to ledge 51 with ledge 51 forming an outer wall of the tank 56. The receiving tank 56 enables the collection of more liquid and limits the risk that liquid will overflow the removable receptacle 50 to contaminate the remainder of the system 1. Also, this improved capacity enables the user to remove the removable receptacle 50 while reducing risks of overflowing during its manipulation, such as after its removal and before it is emptied. The tank 56 is here shown as a deeper part, again preferably located along one lateral edge of the receptacle 50.

The removable receptacle 50 additionally includes a locating member, in this example a locating pin 53, which cleverly eases the positioning and the position holding of the receptacle 50 on the base 2. The upper face of the base 2 has a correspondingly shaped and located cavity, which allows the insertion of the locating pin 53 of the removable receptacle 50. Moreover, the locating pin 53 promotes a centering of the receptacle 50 so that the inner ledge 52 and the receptacle 50 in general is prevented from rubbing or otherwise affecting the operation of the weighing shaft 8. Of course, further locating members could be provided, and mating locating formations could be oppositely disposed. Accordingly, several possibilities exist depending, for example, on the number and shape of locating member 53, which could also be cylindrical or rectangular for example.

While the material, thickness, and overall configuration of the receptacle 50 could vary, FIG. 3 also illustrates that the receptacle 50 could be made of a relatively thick material or materials, such as a molded plastic material. The edges of the receptacle can be rounded or provided with fillets. The round protruding edges prevent injuries. The inner edges provided with fillets ease a complete cleaning of the receptacle 50.

Figure 4:
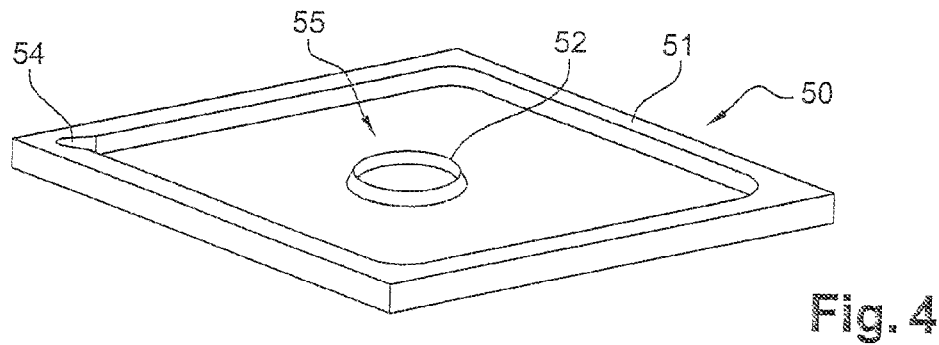
FIG. 4 is a perspective view of a further embodiment of a removable receptacle as taught herein.

In the embodiment of FIG. 4, the removable receptacle 50 can further include a dispensing spout 54, which can ease the discharge of the collected liquid. The dispensing spout 54 in this embodiment has a triangular shape, but other shapes are possible. The dispensing spout 54 can, as shown, be in a corner of the receptacle 50. In other embodiments, the removable receptacle 50 could have several dispensing spouts 54. Where multiple spouts 54 are provided, the spouts 54 could have different shapes and could be located at different places along the periphery of the receptacle 50.

Figure 5:
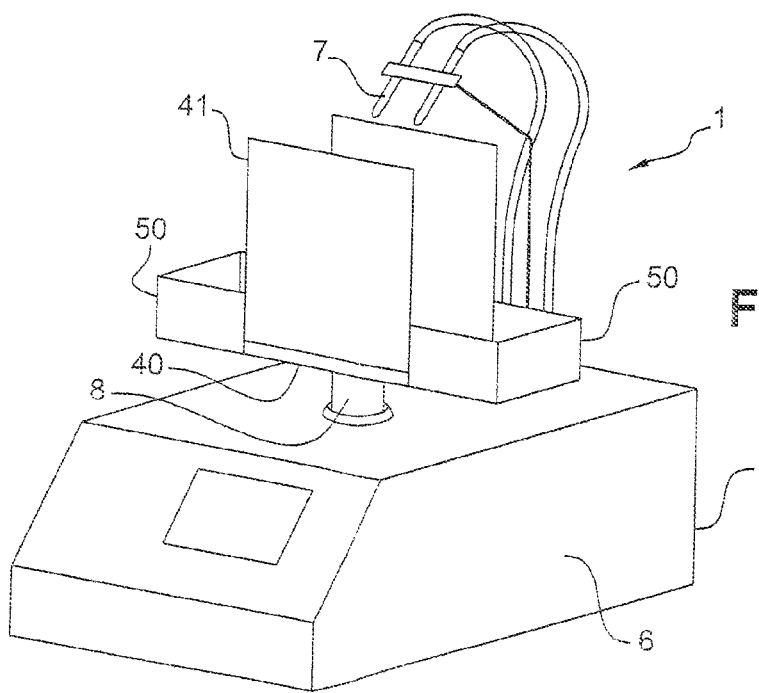
FIG. 5 is a schematic perspective view of an embodiment of the gravimetric dispensing system disclosed herein.

Another potential embodiment of the system 1 is shown in FIG. 5. There, the receptacle 50 is fixed to or integrated as part of the support stand 40. The receptacle 50 and the support stand 40 in the depicted embodiment can be removable as a unit.

Of course, the disclosed volumetric dispensing system 1 is not limited to the examples that have just been described and shown. Numerous modifications and, potentially, additions can be applied to these examples within the scope of the invention. In addition, various features, shapes, variations and embodiments of the volumetric dispensing system 1 can be combined according to various combinations for they are not incompatible or exclusive one from the other.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also all equivalents thereof that might be now known or hereafter discovered.

The invention claimed is:

1. A gravimetric dispensing system for dispensing a predetermined quantity of liquid into a container, the system comprising:

a liquid delivery apparatus comprising a pump and at least one conveying conduit for dispensing a quantity of liquid;

a base structure with a weighing apparatus;

a support stand for retaining the container with the container disposed to receive the quantity of liquid from the conveying conduit of the liquid delivery apparatus wherein the support stand is disposed below the at least one conveying conduit of the liquid delivery apparatus;

wherein the weighing apparatus supports the support stand to provide a determination of a weight of the support stand, the container, and any liquid deposited into the container; and a liquidtight receptacle for collecting any leaked liquid whereby the receptacle can collect liquid leaked out of the container or liquid that may leak where no container is retained by the support stand wherein the receptacle is disposed on the base structure and below the support stand and wherein the receptacle has a bottom that covers at least a portion of the base structure, a central opening in the bottom, an inner ledge that surrounds the central opening, and an outer ledge that surrounds an outer periphery of the bottom wherein the inner and outer ledges extend upward from the base by non-zero heights, wherein the bottom of the receptacle is continuous except for the central opening, and wherein the inner and outer ledges define continuous, liquidtight surfaces with the bottom of the receptacle;

wherein the weighing apparatus supports the support stand by a connection and wherein the connection is received through the central opening in the receptacle.

2. The system of claim 1 wherein the receptacle rests atop the base structure without fastening between the receptacle and the base structure whereby the receptacle is removable from the base structure.

3. The system of claim 1 wherein the receptacle further comprises a tank disposed between the bottom of the receptacle and the outer ledge of the receptacle wherein the tank comprises a liquidtight trough deeper than the bottom of the receptacle.

4. The system of claim 3 wherein the receptacle has at least one dispensing spout.

5. The system of claim 1 wherein the receptacle lays on the base structure and wherein the receptacle is spaced from the weighing apparatus thereby to avoid affecting weighing by the weighing apparatus.

6. The system of claim 1 wherein the receptacle is removable from the base structure.

7. The system of claim 1 wherein the support stand is separable from the weighing apparatus and wherein the receptacle is removable from the base structure when the support stand is separated from the weighing apparatus.

8. The system of claim 7 wherein the receptacle has at least one locating formation for engaging the base structure wherein the locating formation comprises a locating protuberance and wherein the base has a correspondingly shaped and located cavity for receiving the locating protuberance.

9. The system of claim 1 wherein the receptacle is fixed to the support stand.

10. The system of claim 9 wherein the receptacle and the support stand are removable as a unit.

11. The system of claim 1 wherein the support stand has a base and first and second upstanding walls that project in opposition from the base whereby the container can be supported by the upstanding walls and the base.

12. The system of claim 11 wherein the weighing apparatus has an upstanding weighing shaft, wherein the support stand further comprises a sleeve that depends from the base of the support stand, and wherein the sleeve removably receives the weighing shaft.

13. The system of claim 1 wherein the weighing apparatus has an upstanding weighing shaft, wherein the support stand further comprises a sleeve that depends from the base of the support stand, and wherein the sleeve removably receives the weighing shaft.

14. A gravimetric dispensing system for dispensing a predetermined quantity of liquid into a container, the system comprising:

a liquid delivery apparatus comprising a pump and at least one conveying conduit for dispensing a quantity of liquid;

a base structure with a weighing apparatus;

a support stand for retaining the container with the container disposed to receive a quantity of liquid;

wherein the weighing apparatus supports the support stand through a connection to provide a determination of a weight of the support stand, the container, and any liquid deposited into the container; and a liquidtight receptacle for collecting any leaked liquid wherein the receptacle has a bottom that covers at least a portion of the base structure, an opening in the bottom, a ledge surrounding the bottom, and a ledge surrounding the opening wherein the connection passes through the opening in the receptacle and wherein the opening of the receptacle is spaced from the connection of the weighing apparatus thereby to avoid affecting weighing by the weighing apparatus.

* * * * *